US006512191B1

(12) United States Patent
Makino et al.

(10) Patent No.: US 6,512,191 B1
(45) Date of Patent: Jan. 28, 2003

(54) PUSH-SWITCH AND METHOD FOR MANUFACTURING THE SAME

(75) Inventors: Takashi Makino, Fukui (JP); Yoshihiko Kamimura, deceased, late of Fukui (JP), by Miyuki Kamimura, legal representative

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/832,941

(22) Filed: Apr. 12, 2001

(30) Foreign Application Priority Data

Apr. 13, 2000 (JP) ....................................... 2000-111756

(51) Int. Cl.[7] ........................ H01H 13/16; H01H 11/00; H01H 11/06; H01H 21/26; B60Q 1/44

(52) U.S. Cl. ....................... 200/531; 29/622; 200/16 D; 200/61.89

(58) Field of Search .......................... 200/4, 5 R, 11 G, 200/16 R, 16 C, 16 D, 243, 61.88, 61.89, 292, 530–532, 16 E; 29/622

(56) References Cited

U.S. PATENT DOCUMENTS 3,346,708 A * 10/1967 Morra ...................... 200/11 G
RE28,555 E * 9/1975 Koepke ...................... 200/164
4,137,440 A * 1/1979 Bryant ....................... 200/541
4,733,027 A * 3/1988 Hirata .................... 200/531 X
5,670,762 A * 9/1997 Futamura .................. 200/16 D
5,828,024 A * 10/1998 Takano et al. .............. 200/531
6,054,654 A * 4/2000 Ebata ....................... 200/11 G

* cited by examiner

*Primary Examiner*—J. R. Scott
(74) *Attorney, Agent, or Firm*—Wenderoth, Lind & Ponack, L.L.P.

(57) ABSTRACT

Disclosed is a push-switch that comprises a tubular case, a fixed electrical contact in the tubular case, an operation shaft in the tubular case, a contact piece held by a holding part to the operation shaft, a resilient member for urging the operation shaft, and a cover for closing the tubular case. The holding part defines grooves and a recess between the grooves, and the contact piece has a fixing part positioned within the grooves and a protrusion positioned within the recess. The contact piece also includes an arm having an electrical contact thereon for sliding engagement with the fixed electrical contact upon depression of the operation shaft, and the cover includes an opening. The cover also includes a rib projecting downwardly from a lower side thereof, with an inner side of the rib being flush with a contact surface of the fixed electrical contact. To assemble the push-switch the contact piece is attached to the operation shaft via the holding part. Then, the operation shaft is inserted into the opening of the cover such that the electrical contact on the arm of the contact piece flexibly engages an inner side of the rib. Then, while maintaining the flexible engagement between the electrical contact on the arm and the inner side of the rib, the cover is combined with the tubular case.

24 Claims, 11 Drawing Sheets

PUSH-SWITCH AND METHOD FOR MANUFACTURING THE SAME

BACKGROUND OF THE INVENTION

1. Field of the Invention

The present invention relater to a push-switch for a vehicle used for activating or de-activating stop-lamps of a brake pedal operation shaft of an automobile, and a method for manufacturing the same.

2. Description of the Related Art

Hitherto, main controls when a brake pedal of an automobile is operated include activation of stop-lamps for noticing that the brake pedal has been depressed, and cancellation of an automatic drive function for automatically running the automobile at a constant speed. These controls are effected by different switches, or one switch having plural functions.

A conventional push-switch is explained by referring to FIG. 8 to FIG. 11. That is, FIGS. 8–11 depict prior art.

FIG. 8 is a sectional view of a conventional push-switch, and FIG. 9 is its exploded perspective view. A nearly tubular case 1 made of an insulating resin is open at its top, and has an inner bottom. On the inner bottom, a pair of fixed contacts 2 made of a conductive metal plate projecting upwardly along the left inner wall, and a pair of fixed contacts 3 made of a conductive metal plate similarly projecting upwardly and bent in an L-shape at their upper ends, are fixed and planted by fusing or crimping. The contacts 2 have terminals 2B, and the contacts 3 have terminals 3B.

By a contact pressure spring 5, in a slightly depressed coil form disposed between the lower central side of a movable contact 4 made of a conductive metal plate, and the inner bottom of the case 1, both ends of the movable contact 4 elastically abut against the bent lower sides of the fixed contacts 3. That is, the pair of fixed contacts 3 are electrically connected through the movable contact 4 via contact portions 3A and 4A.

An operation shaft 6 is accommodated in the case 1 and is movable vertically. A fixing part 7A at one end of a contact piece 7 made of a thin elastic metal plate is held and fixed at the side of the operation shaft 6 by means of a rivet 8, an intermediate arm 7C is slightly deflected, and a contact part 7B at another end elastically abuts the left inner wall of the case 1.

An operation spring 9 in a slightly depressed coil form disposed between the lower sidle of the operation shaft 6 and the inner bottom of the case 1 thrusts the operation shaft 6 upwardly. The opening 1A of the case 1 is closed with a cover 10. The cover 10 has a threaded bearing 10A. The operation shaft 6 is inserted into a central penetration hole 10B of the bearing 10A, and a push-switch 11 is composed.

In the push-switch having such structure, first, the pair of fixed contacts 2 and fixed contacts 3 are fixed on the inner bottom of the case 1 by fusing or crimping. Then, the movable contact 4 and slightly depressed contact pressure spring 5 are inserted between the inner bottom of the case 1 and the fixed contacts 3, and both ends of the movable contact 4 elastically abut the bent lower sides of the pair of fixed contacts 3 via contact portions 3A and 4A.

By the rivet 8, the operation shaft 6 holding and fixing the contact piece 7 at its side is put into the case 1, while depressing the operation spring 9 placed against the inner bottom of the case 1. By the cover 10 having the operation shaft 6 inserted in the penetration hole 10B, the opening of the case 1 is closed, and the push-switch 11 is completed.

In this structure, by pushing the upper side of the operation shaft 6 projecting from the penetration hole 10B, as shown in a sectional view in FIG. 10, the operation shaft 6 moves downwardly while depressing the operation spring 9. As a result, the contact part 7B of the contact piece 7 held at the side of the operation shaft 6 elastically slides on the left inner wall of the case 1, and comes into contact with the fixed contacts 2. That is, the pair of fixed contacts 2 are electrically connected by way of the contact piece 7.

At the same time, the lower side of the operation shaft 6 pushes the upper central side of the movable contact 4, and the contact pressure spring 5 is depressed, and both ends or contact portions 4A of the movable contact 4 depart from the bent lower sides or contact portions 3A of the pair of fixed contacts 3, and the pair of fixed contacts 3 are electrically isolated.

As shown in a side view in FIG. 11, in the state that the operation shaft 6 is depressed by angle member 12B formed integrally with brake pedal 12, the outer circumference of the bearing 10A of push-switch 11 is mounted on a car body by a stopper 13. The angle member 12B is held on the car body rotatably by means of an upper end support 12A.

Further, as shown in FIG. 11, a connector 14 is fitted to the push-switch 11. The fixed contacts 2 are connected to an electronic circuit 16 for controlling the automatic drive function for keeping the running speed constant, through a power supply unit 15. The fixed contacts 3 are further connected to stop-lamp 17 through the power supply unit 15.

Thus, in the depressed state of the operation shaft 6 of the push-switch 11; that is, in the running state of an automobile, as shown in FIG. 10, since the fixed contacts 2 are electrically connected through the contact piece 7, the automatic drive function of the electronic circuit 16 is in an active state. At this time, the stop-lamp connected to the fixed contacts 3 is in a de-activated state.

When stepping on the brake pedal 12 as shown in FIG. 11, the angle member 12B rotates about the support 12A, and departs from the operation shaft 6 of the push switch 11. As a result, the operation shaft 6 returns to the state shown in FIG. 8 by the thrusting force of the contact pressure spring 5 and operation spring 9, and the contact piece 7 departs from the fixed contacts 2, and the automatic drive function of the electronic circuit 16 is canceled.

At the same time, by the thrusting force of the contact pressure spring 5, both ends of the movable contact 4 come into contact with the bent lower sides of the pair of fixed contacts 3 via contact portions 3A and 4A, and hence the stop-lamps 17 are activated. As a result, stepping on the brake pedal 12 is noticed.

In the conventional push-switch; however, the contact piece 7 of a thin elastic metal plate is likely to be deformed when holding and fixing the contact piece 7 to the side of the operation shaft 6 by the rivet 8, or when assembling the operation shaft 6, holding this contact piece 7, into the case 1. It also takes much time to assemble the switch.

SUMMARY OF THE INVENTION

The invention is devised in light of the conventional problems, and it is hence an object thereof to present an easy-to-assemble and inexpensive push-switch capable of obtaining a stable contact of contacts, and a method for manufacturing the same.

The push-switch of the invention comprises:

a tubular case made of an insulating resin with an open top and having an inner bottom;

a pair of fixed contacts planted on the inner bottom of the case and projecting upwardly;

an operation shaft vertically movable and accommodated in the case;

a contact piece of a thin elastic metal plate, with a fixing part at one end held at the side of the operation shaft, with an intermediate arm slightly deflected, and with a contact part at another end elastically sliding on fixed contacts by vertical movement of the operation shaft;

an operation spring in a coil form installed in the case in a slightly depressed state and thrusting the operation shaft upwardly; and a cover having a penetration hole in the center thereof for inserting the operation shaft for closing the opening of the case.

The operation shaft has a holding part at its side, and the holding part has a nearly U-shaped groove at both its ends, and a recess with an open upper end formed in its center. The fixing part of the contact piece is inserted into the groove of the holding part from beneath, and a tongue at an upper side and projecting from both ends of the fixing part of the contact piece abuts the lower side of the groove, while a protrusion projecting in the direction of the operation shaft from the center of the fixing part of the contact piece is engaged with the lower end of the recess of the holding part.

The push-switch of the invention further includes, at the lower side of the cover, a pair of ribs projecting downwardly with their inner sides flush with the contact surface of the fixed contact, and the contact part of the contact piece elastically abuts against the inner side of each rib.

The manufacturing method of the push-switch of the invention comprises, in the push-switch having the above structure, the steps of: (a) holding the fixing part of the contact piece in the holding part at the side of the operation shaft; (b) inserting the operation shaft into a penetration hole in the center of the cover; (c) temporarily holding the operation shaft on the cover, with the contact part of the contact piece elastically abutting the inner side of the ribs; and (d) combining the cover, temporarily holding the operation shaft, and the case.

DESCRIPTION OF THE PREFERRED EMBODIMENTS

Figure 1:
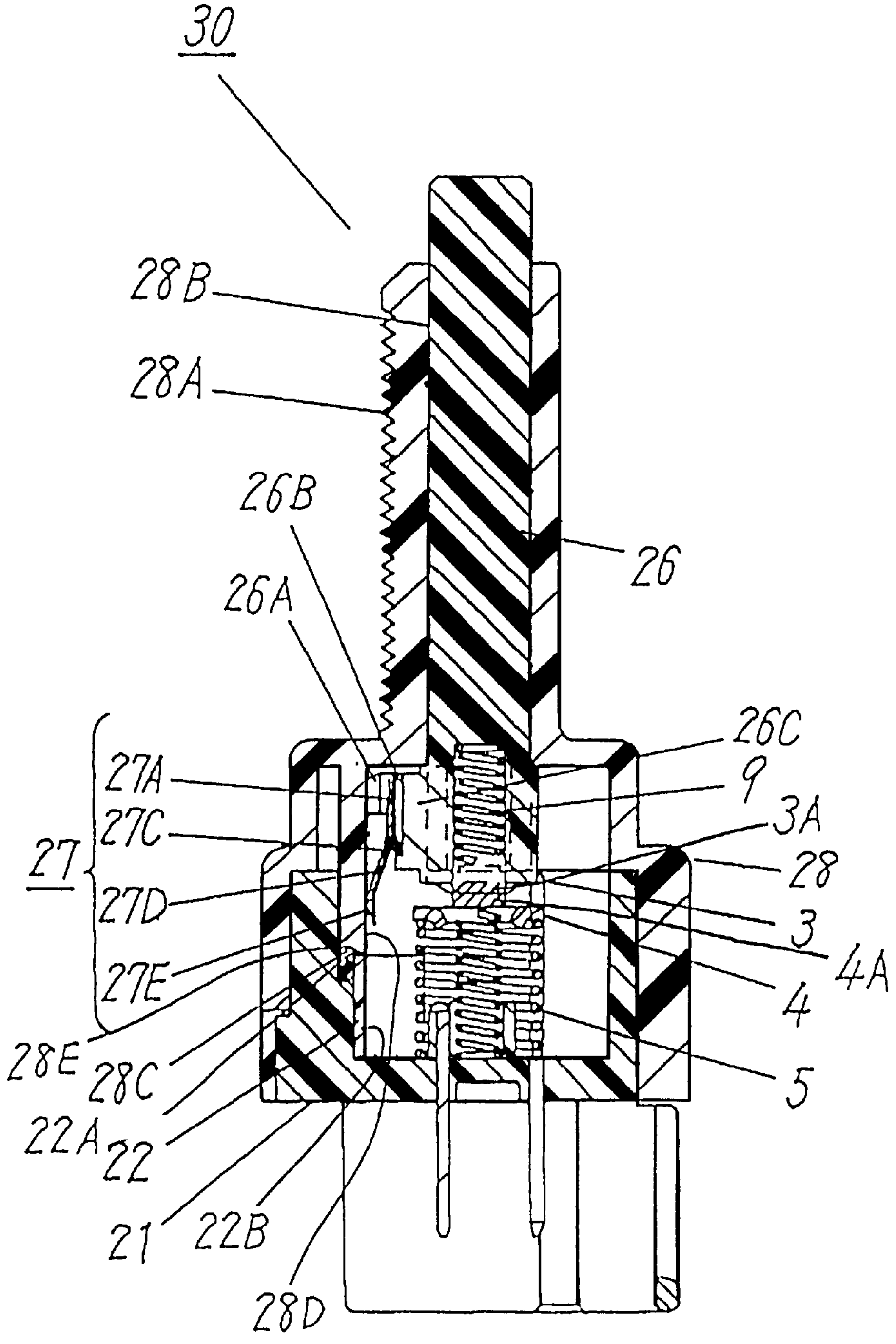
FIG. 1 is a sectional view of an inventive push-switch of an embodiment of the invention.

An embodiment of the invention is described below while referring to FIG. 1 to FIG. 7.

Same parts as in the structure of the prior art described above are identified with same reference numerals, and duplicate explanation is omitted.

(Embodiment 1)

Figure 2:
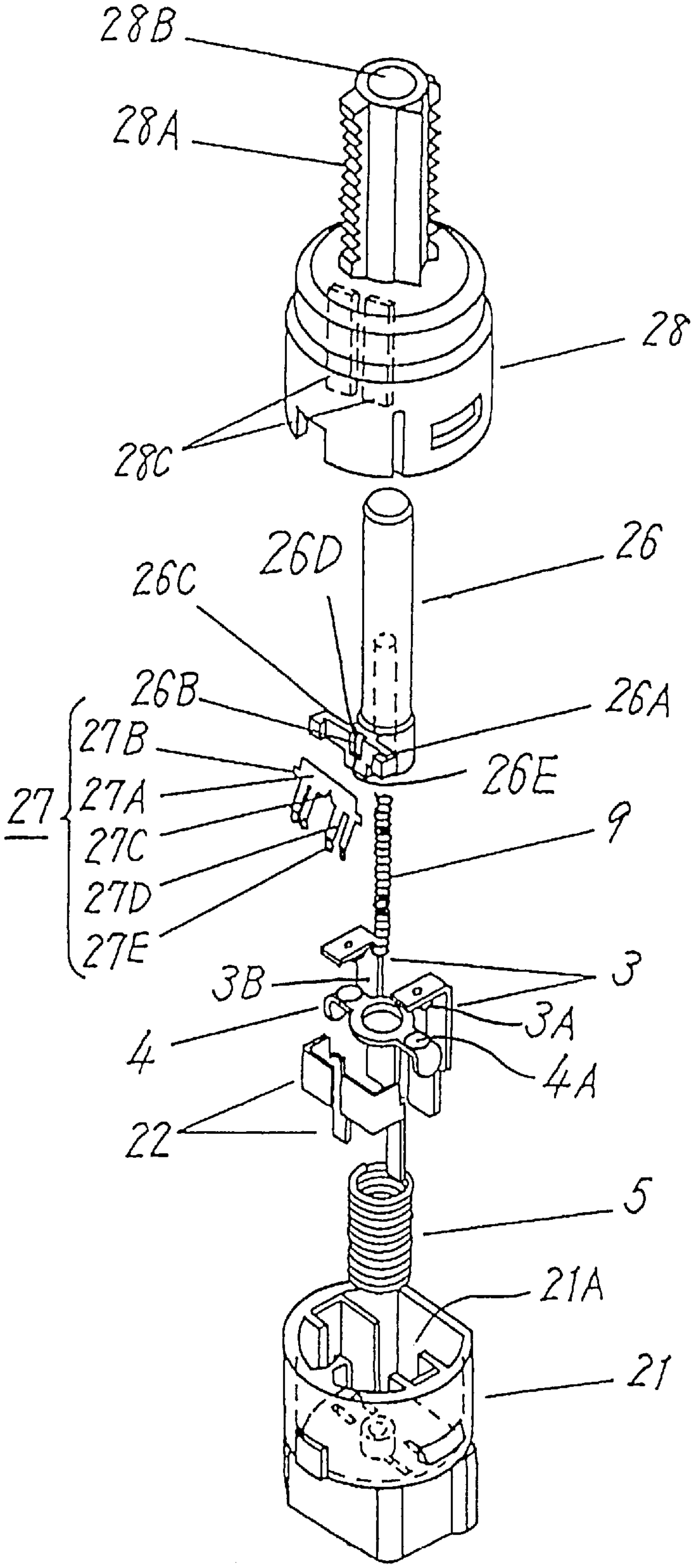
FIG. 2 is an exploded perspective view of the inventive push-switch.

FIG. 1 is a sectional view of push-switch in an embodiment of the invention, and FIG. 2 is a exploded perspective view of the same. A nearly tubular case 21 of insulating resin is open at an upper side as shown at 21A, and has an inner bottom. On the inner bottom, a pair of fixed contacts 22 made of a conductive metal plate projecting upwardly along the left inner wall, and a pair of fixed contacts 3 made of a conductive metal plate similarly projecting upwardly and bent in an L-shape at their upper ends, are fixed and planted by fusing or crimping. The contacts 3 have terminals 3B.

By a contact pressure spring 5, in a slightly depressed coil form disposed between a lower central side of a movable contact 4 made of a conductive metal plate, and the inner bottom of the case 21, both ends of the movable contact 4 elastically abut the bent lower side of the fixed contacts 3 via contact portions 3A and 4A. That is, the pair of fixed contacts 3 are electrically connected through the movable contact 4.

An operation shaft 26 is accommodated in the case 21 and is movable vertically. At the side of the operation shaft 26, a holding part 26C forming a nearly U-shaped groove 26A at both ends, and a recess 26B with an open upper end 26D in its center, is disposed. In the groove 26A, a fixing part 27A at one end of a contact piece 27 made of an elastic thin plate is inserted from beneath.

At the lower side of the groove 26A, the upper side 27F of a tongue 27B projecting outwardly from both ends of the fixing part 27A is abutting. At the lower end 26E of the recess 26B, a protrusion 27C projecting in the direction of the operation shaft 26 from the center of the fixing part 27A is engaged. As a result, the fixing part 27A of the contact piece 27 is held and fixed in the holding part 26C of the operation shaft 26.

An operation spring 9 in a slightly depressed coil form is disposed between the lower side of the operation shaft 26 and the inner bottom of the case 21, and thrusts the operation shaft 26 upwardly. The opening of the case 21 is closed with a cover 28, and the cover 28 has a threaded bearing 28A. The operation shaft 26 is inserted into a penetration hole 28B of the bearing 28A.

Beneath the cover 28, a pair of ribs 28C projecting downwardly and flush with the contact surface of the fixed contacts 22, is disposed. At the inner side 28D of each rib 28C, with an intermediate arm 27D slightly deflected, a contact part 27E at other end of the contact piece 27 is elastically abutting. A lower end 28E of the rib 28C abuts the upper end 22A of the fixed contacts 22.

In a push-switch 30 having such structure, first, the pair of fixed contacts 22 and fixed contacts 3 are fixed on the inner bottom of the case 21 by fusing or crimping. Then, the movable contact 4 and slightly depressed contact pressure spring 5 are inserted between the inner bottom of the case 21 and the fixed contacts 3, and both ends of the movable contact 4 elastically abut the bent lower sides of the pair of fixed contacts 3 via contact portions 3A and 4A.

Figure 3:
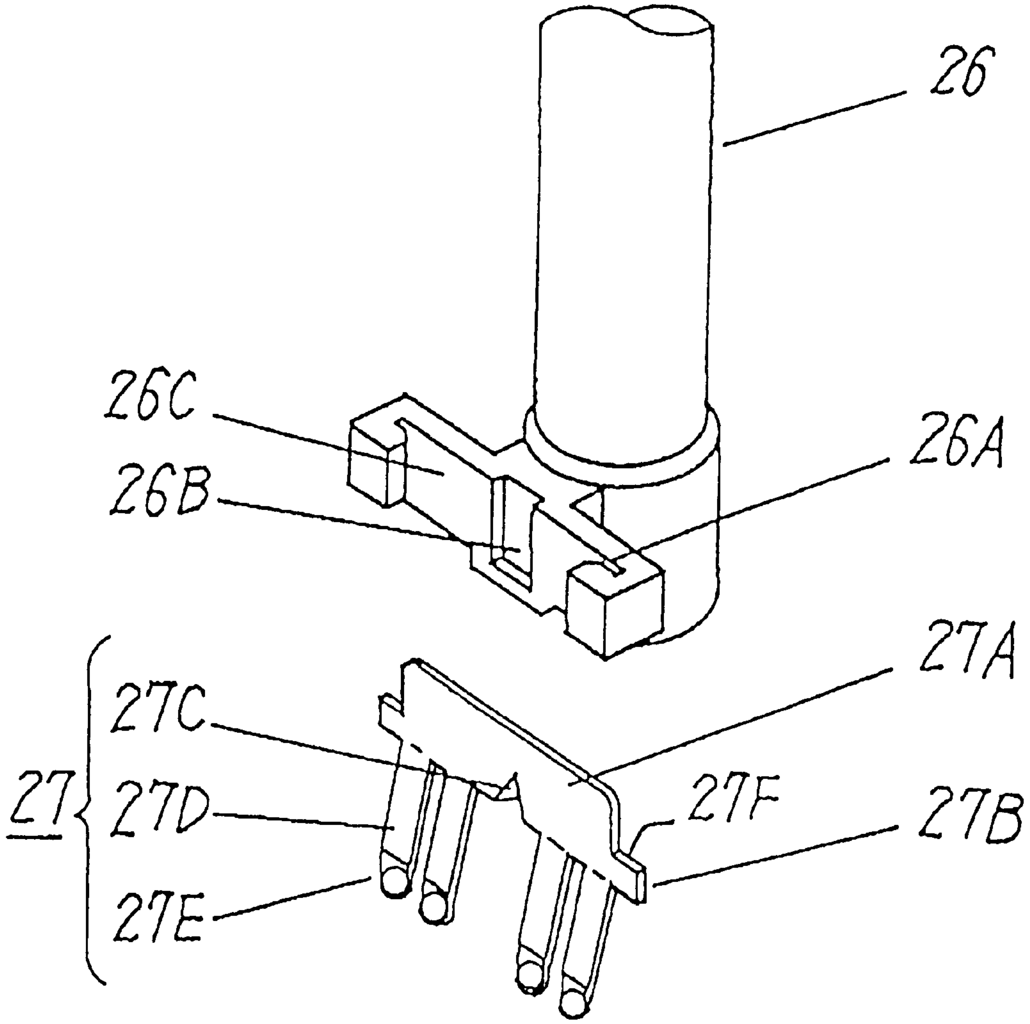
FIG. 3 is a partial perspective exploded view of the inventive push-switch.

Next, as shown in a partial exploded perspective view in FIG. 3, the fixing part 27A of the contact piece 27 is inserted from beneath into the groove 26A of the holding part 26C of the operation shaft 26, and the upper side 27F of the tongue 27B of the contact piece 27 abuts the lower side of the groove 26A. At the lower end of the groove 26B of the holding part 26C, the protrusion 27C of the contact piece 27 is engaged. As a result, the contact piece 27 is held and fixed on the holding part 26C of the operation shaft 26.

Figure 4:
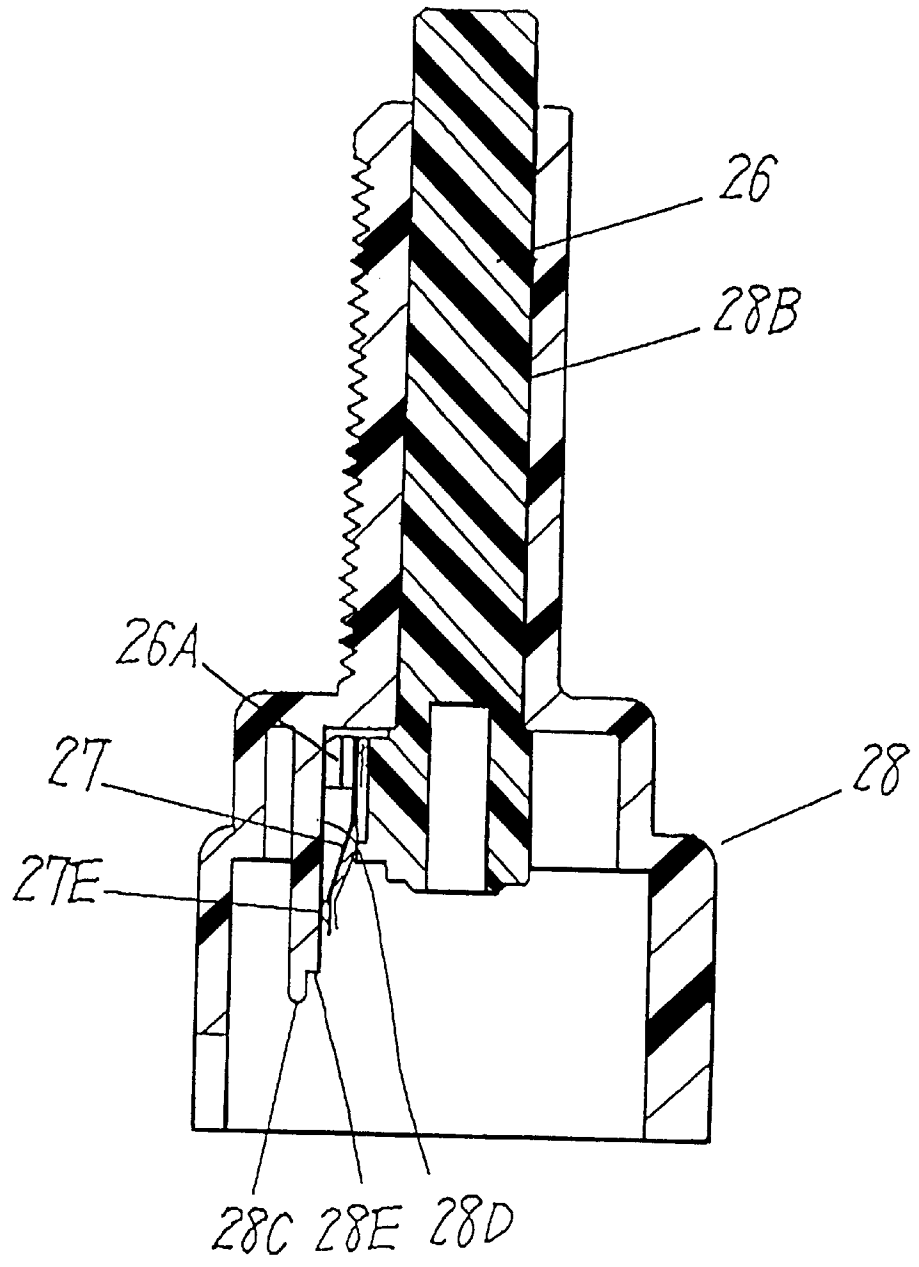
FIG. 4 is a partial sectional view of the inventive push-switch.

Then, as shown in a partial sectional view in FIG. 4, the operation shaft 26 holding the contact piece 27 is inserted into the central penetration hole 28B of the cover 28. The contact part 27E of the contact piece 27 elastically abuts the ribs 28C at the lower ride of the cover 28. The operation shaft 26 is temporarily held in the cover 28.

Finally, the cover 28 temporarily holding the operation shaft 26, and the case 21 incorporating the contact pressure spring 5, the operation spring 9 and the movable contact 4, and having the fixed contacts 22 and fixed contacts 3, are combined. Closing the opening 21A of the case 21 by the cover 28, completes the push-switch 30.

Figure 5:
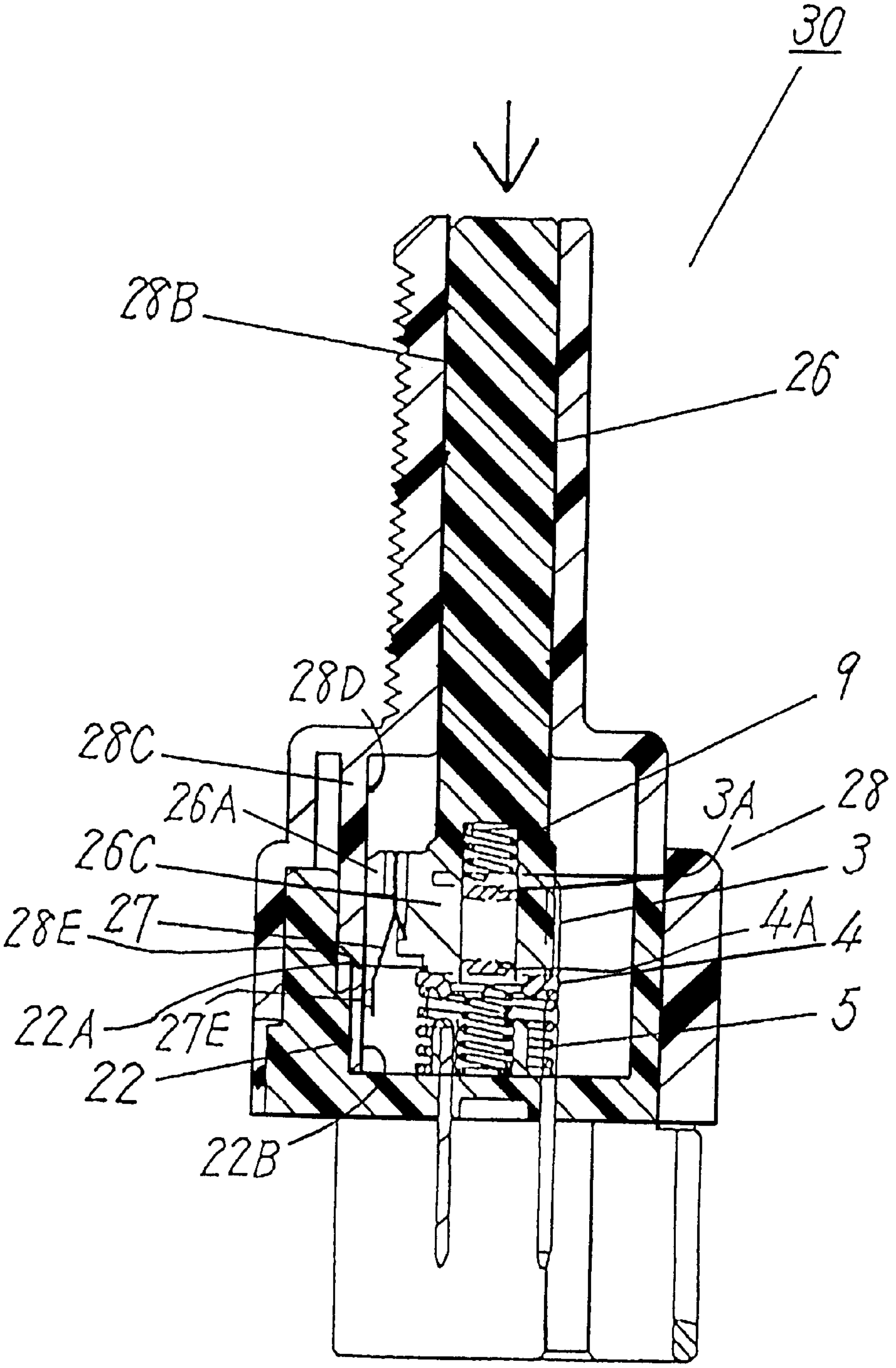
FIG. 5 is a sectional view of the inventive push-switch during operation.

In this structure, by pushing the upper side of the operation shaft 26 projecting from the penetration hole 28B of the cover 28, as shown in a sectional view in FIG. 5, the operation shaft 26 moves downwardly while depressing the operation spring 9. As a result, the contact part 27E of the contact piece 27 held at the side of the holding part 26C elastically slides on the inner sides 28D of the ribs 28*c* of the cover 28, and the contact surface comes into contact with the fixed contacts 22 flush with the inner sides 28D of the ribs 28C. That is, the pair of fixed contacts 22 are electrically connected by way of the contact piece 27.

At the same time, the lower side of the operation shaft 26 pushes the upper central side of the movable contact 4, and the contact pressure spring 5 is depressed, and both ends or contact portions 4A of the movable contact 4 depart from the bent lower sides or contact portions 3A of the fixed contacts 3, and the pair of fixed contacts 3 are electrically isolated.

Figure 6:
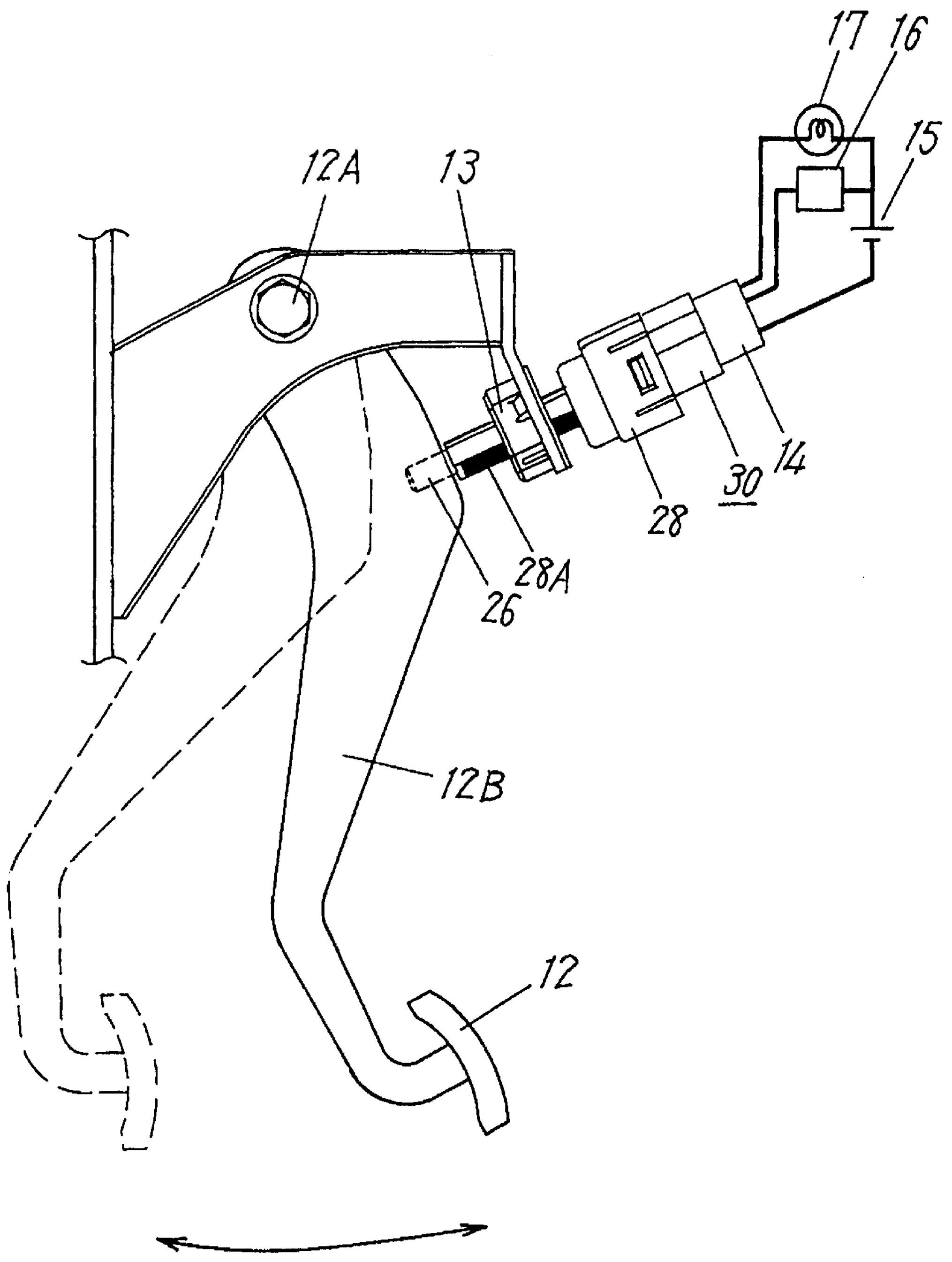
FIG. 6 is a side view of the inventive push-switch when mounted on an automobile.
Figure 7:
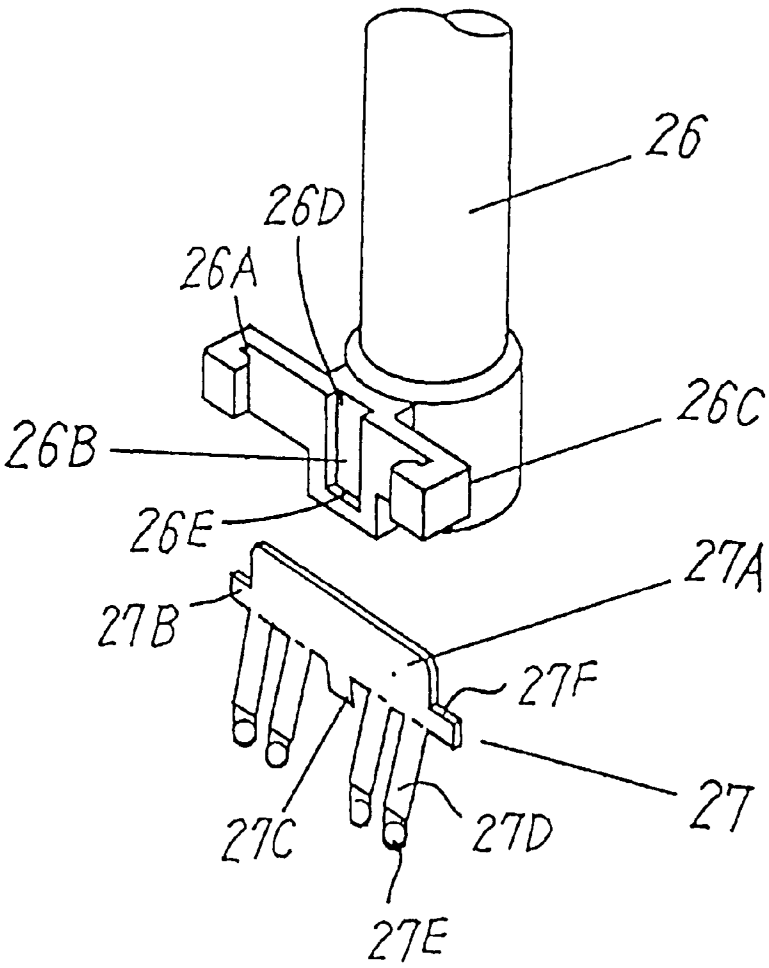
FIG. 7 is a partial exploded perspective view of the inventive push-switch.
Figure 8:
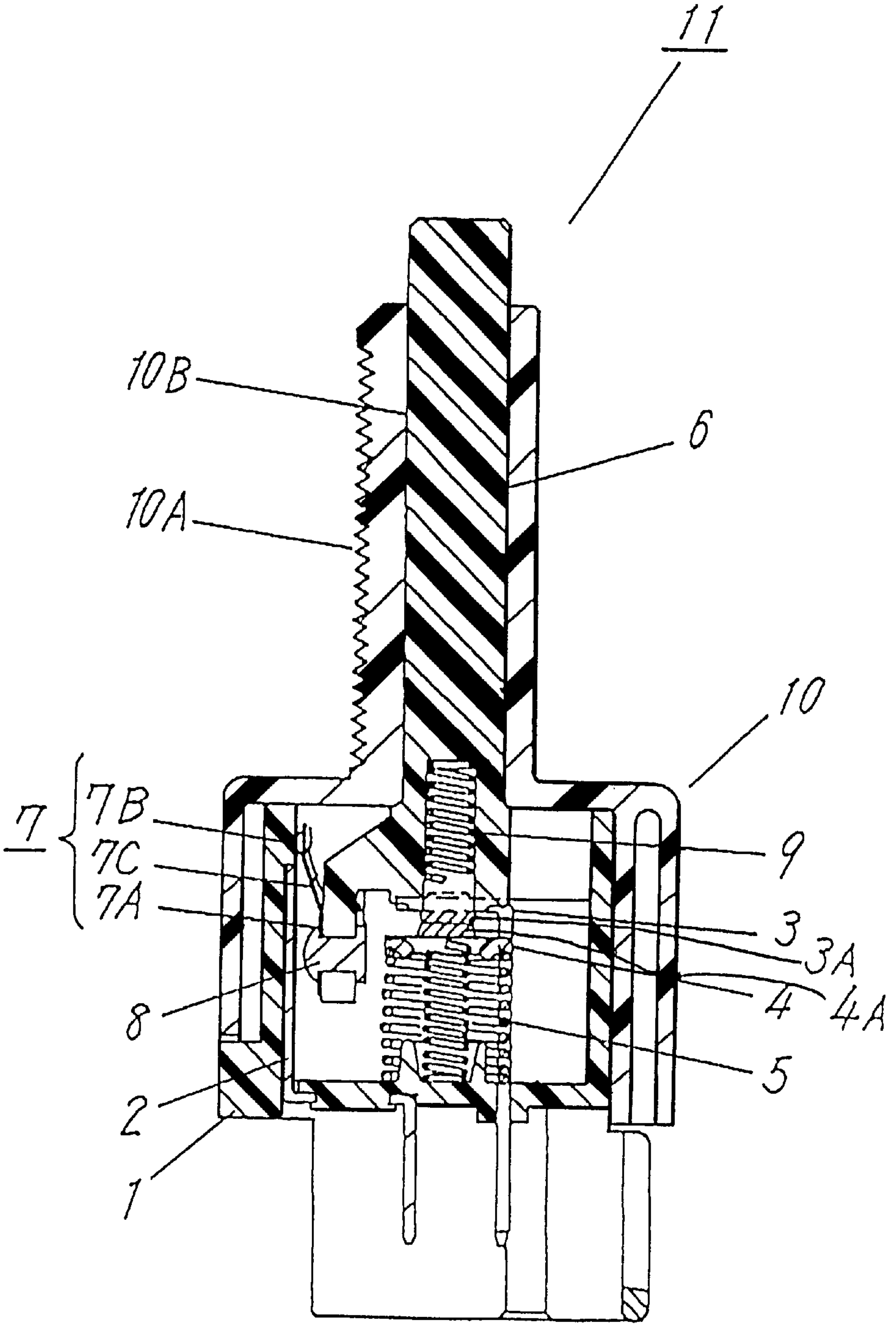
FIG. 8 (PRIOR ART)
FIG. 8 is a sectional view of a conventional push-switch.
Figure 9:
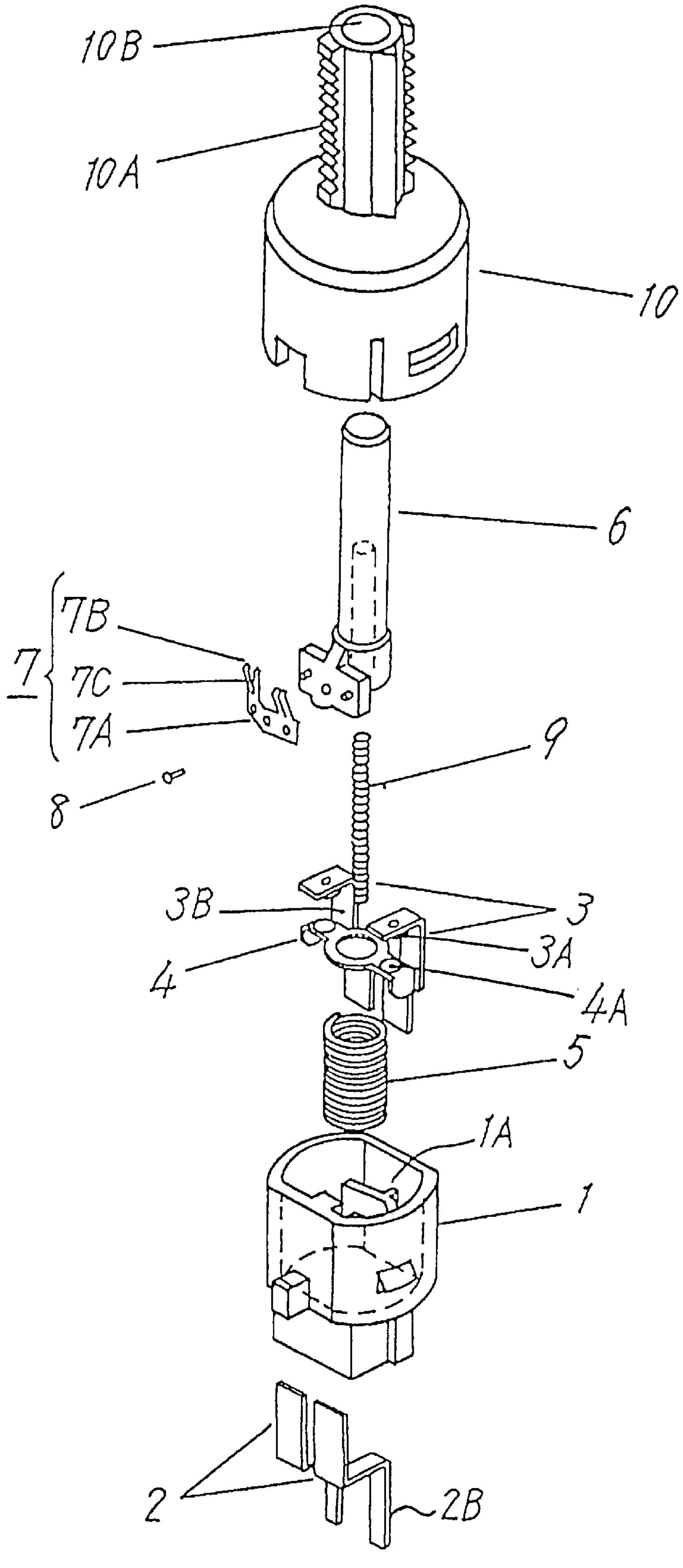
FIG. 9 (PRIOR ART)
FIG. 9 is a exploded perspective view of the conventional push-switch.
Figure 10:
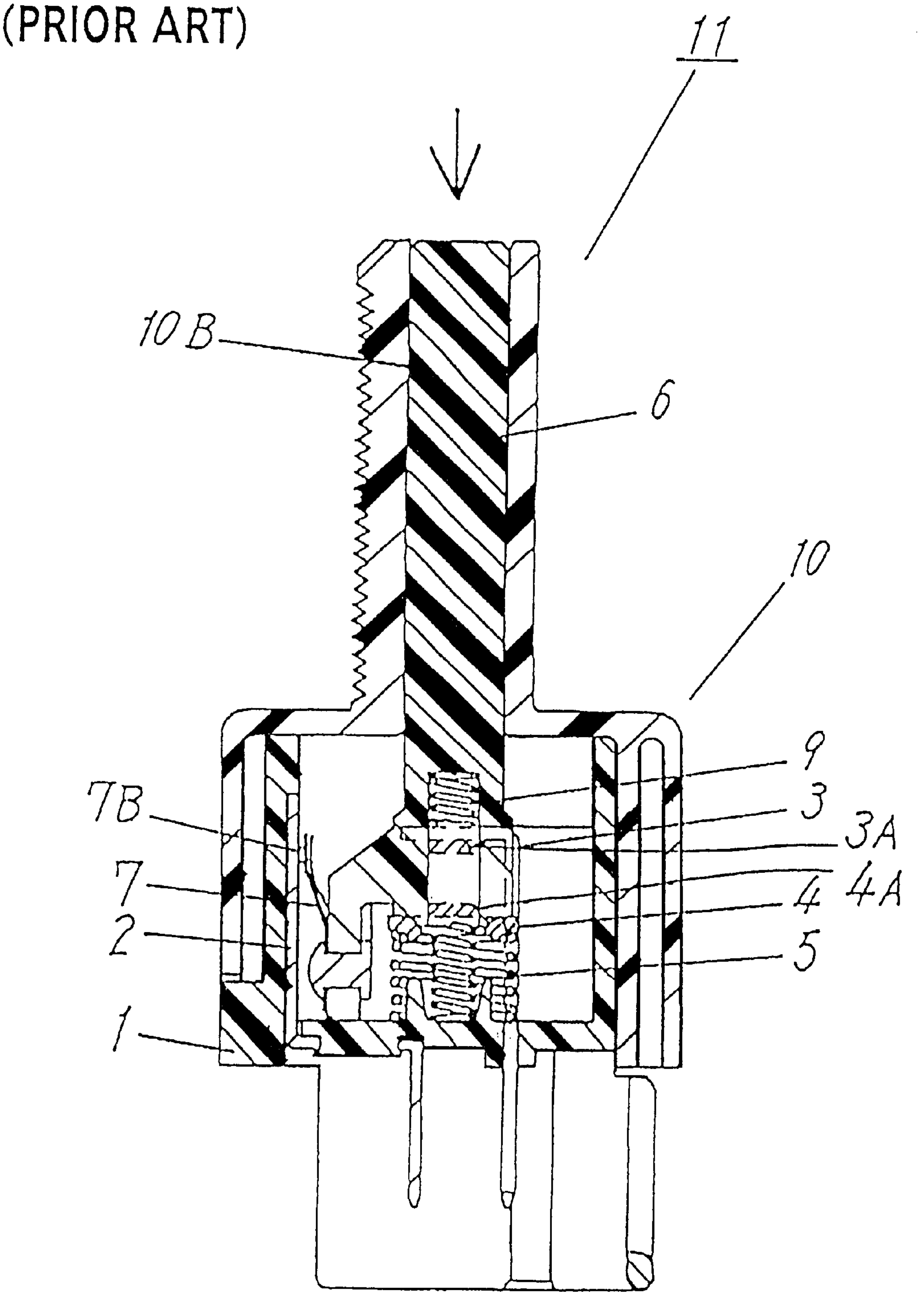
FIG. 10 (PRIOR ART)
FIG. 10 is a sectional view of the conventional push-switch during operation.
Figure 11:
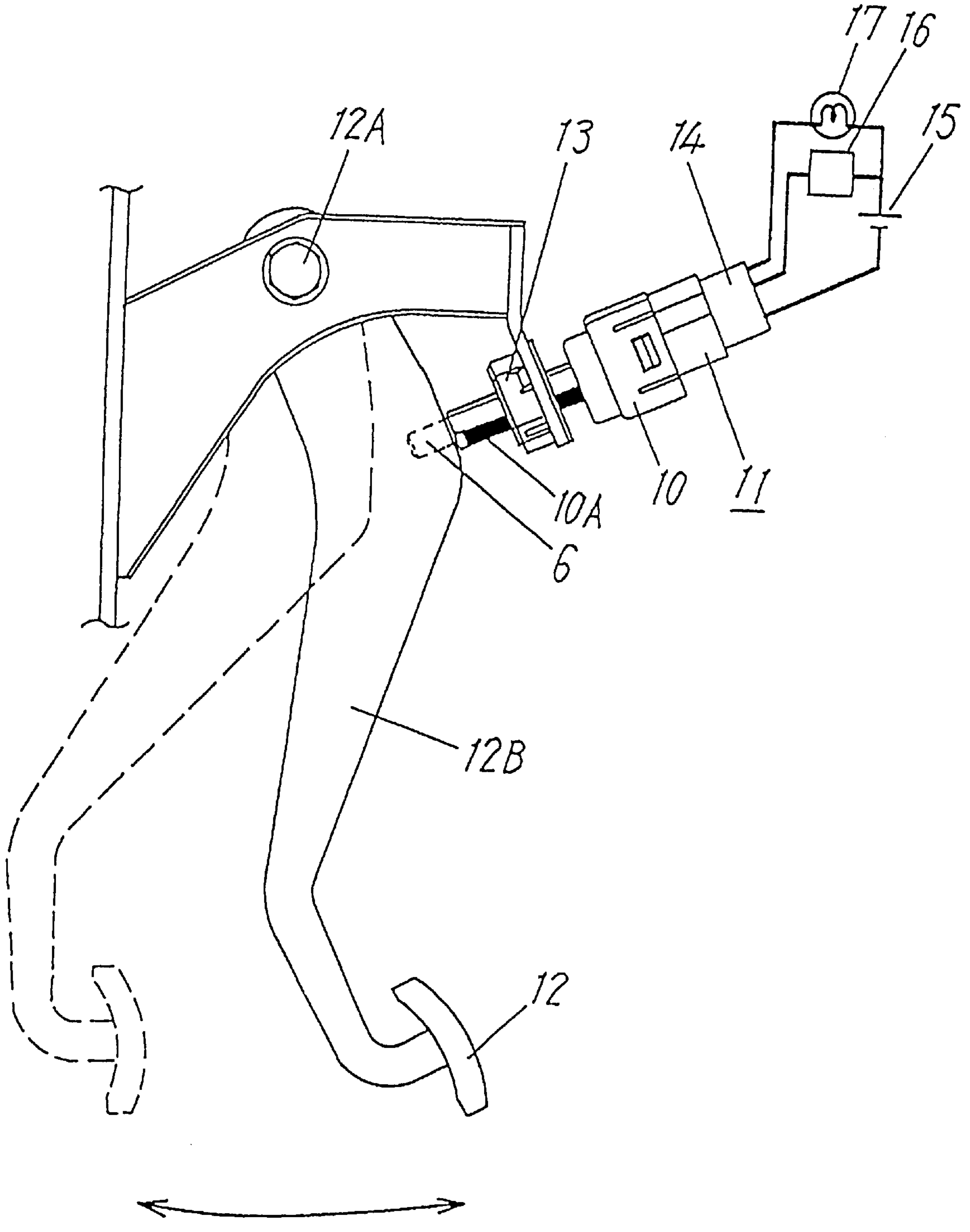
FIG. 11 (PRIOR ART)
FIG. 11 is a side view of the conventional push-switch when mounted on an automobile.

As shown in a side view in FIG. 6, in the state that the operation shaft 26 is depressed by angle member 12B formed integrally with brake pedal 12, the outer circumference of the bearing 28A of the push-switch 30 is mounted on a car body by a stopper 13. The angle member 12B is held on the car body rotatably by means of an upper end support 12A.

Further, as shown in FIG. 6, a connector 14 is fitted to the push switch 30. The fixed contacts 22 are connected to an electronic circuit 16 for controlling an automatic drive function for keeping a running speed constant, through a power supply unit 15. The fixed contacts 3 are connected to stop-lamps 17 of the automobile similarly through the power supply unit 15.

Thus, in the depressed state of the operation shaft 26 of the push-switch 30, when stepping on the brake pedal 12 as indicted by a broken line in FIG. 6, the angle member 12B rotates about the support 12A. As a result, the operation shaft 26 returns to the state shown in FIG. 1 by the thrusting force of the contact pressure spring 5 and operation spring 9. That is, the contact piece 27 departs from the fixed contacts 22, and the automatic drive function of the electronic circuit 16 is canceled.

At the same time, by the thrusting force of the contact pressure spring 5, both ends or contact portions 4A of the movable contact 4 come into contact with the bent lower sides or contact portions 3A of the pair of fixed contacts 3, and hence the stop-lamps 17 are activated. As a result, stepping on the brake pedal 12 is noticed.

Thus, according to the invention, without riveting, fusing or crimping, the fixing part 27A of the contact piece 27 can be instantly held on the holding part 26C of the operation shaft 26. Therefore, when holding and fixing the contact piece 27 on the operation shaft 26, the contact piece is hardly deformed. That is, the contacts can be held in a stable contacting state, and an easy-to-assemble and inexpensive push-switch can be obtained.

Also according to the invention, each rib 28C is disposed in the lower side of the cover 28, with the inner side 28D flush with the contact surface 22B of a respective one of the fixed contacts 22, and the contact part 27E of the contact piece 27 elastically abuts the inner side 28D of each rib 28C, and the switch is assembled in the state of temporarily holding the operation shaft 26 on the cover 28. Accordingly, when assembling the operation shaft 26 holding the contact piece 27 and the case 21, the contact piece 27 is hardly deformed. That is, the contact state of the contacts is further stabilized, and an inexpensive push-switch is obtained. The assembling operation may also be automated easily.

Moreover, according to the invention, by fitting the lower end of each rib 28C, projecting downwardly to the lower side of the cover 28, to the upper end of the fixed contacts 22, in addition to holding the fixed contacts 22 on the case 21 by fusing or crimping, the lower end 28E of each rib 28C of the cover 28 abuts the upper end 22A of a respective one of the fixed contacts 22. Therefore, if an external force is applied to the lower end of the fixed contacts 22, projecting outwardly of the case 21, the fixed contacts 22 can be held more firmly and securely.

Furthermore, in the invention, the central protrusion 27C of the fixing part 27A of the contact piece 27 is formed like a tongue, and with the protrusion 27C slightly deflected, the lower end elastically abuts the lower end 26E of the recess 26B of the holding part 26C of the operation shaft 26. As a result, looseness of the contact piece 27 is eliminated, and the contact state of the contacts is further stabilized.

What is claimed is:

1. A push-switch comprising:

an electrically insulating tubular case having an open end and a closed end;

at least one electrical contact projecting from said closed end of said electrically insulating tubular case towards said open end of said electrically insulating tubular case, said at least one electrical contact having a contact surface;

an operation shaft accommodated in said electrically insulating tubular case for movement between said open end and said closed end;

a holding part on a side of said operation shaft, said holding part defining grooves at opposite sides of said holding part and a recess between said grooves;

a contact piece having a fixing part positioned within said grooves and a protrusion directed towards said operation shaft and positioned within said recess such that said contact piece is attached to said operation shaft via said holding part, and also having at least one arm having an electrical contact thereon for sliding engagement with said contact surface of said at least one electrical contact upon movement of said operation shaft between said closed end and said open end;

a resilient member in said electrically insulating tubular case for urging said operation shaft from said closed end towards said open end; and a cover closing said open end of said electrically insulating tubular case, said cover having an opening receiving said operation shaft.

2. The push-switch according to claim 1, wherein said electrically insulating tubular case comprises an insulating resin tubular case, and wherein said open end corresponds to a top of said insulating resin tubular case and said closed end corresponds to a bottom of said insulating resin tubular case, such that said operation shaft is accommodated in said insulating resin tubular case for linear movement between said top and said bottom of said insulating resin tubular case.

3. The push-switch according to claim 2, wherein said at least one electrical contact comprises two electrical contacts fixed to said bottom of said insulating resin tubular case and projecting therefrom towards said top of said insulating resin tubular case, and wherein said at least one arm having an electrical contact thereon comprises plural arms each having an electrical contact thereon and said contact piece comprises a thin elastic metal plate, such that said plural arms are deflected when said electrical contacts on said plural arms are in sliding contact with said two electrical contacts upon linear movement of said operation shaft between said top and said bottom of said insulating resin tubular case.

4. The push-switch according to claim 3, wherein said resilient member comprises a slightly compressed coil spring for urging said operation shaft away from said bottom of said insulating resin tubular case, and wherein said opening in said cover comprise a central opening of said cover.

5. The push-switch according to claim 4, wherein said grooves comprise U-shaped grooves and said recess is centrally located between said U-shaped grooves, and wherein said fixing part includes tongues extending from opposite ends thereof, respectively, and said fixing part is positioned within said grooves by having said tongues positioned within said U-shaped grooves, respectively.

6. The push-switch according to claim 5, wherein said recess is defined by an open upper end and a lower surface, and wherein said protrusion is positioned within said recess such that said protrusion engages said lower surface.

7. The push-switch according to claim 6, further comprising two ribs projecting away from a lower side of said cover, with an inner side of each of said two ribs being flush with said contact surface of each of said two electrical contacts, respectively, such that said plural arms are deflected when said electrical contacts on said plural arms are in contact with said inner side of each of said two ribs, respectively.

8. The push-switch according to claim 7, wherein a lower surface of each of said two ribs abuts a respective upper surface of each of said two electrical contacts.

9. The push-switch according to claim 6, wherein said protrusion comprises a tongue such that a lower end of said tongue elastically engages said lower surface of said recess.

10. The push-switch according to claim 1, further comprising at least one rib projecting away from a lower side of said cover, with an inner side of said at least one rib being flush with said contact surface of said at least one electrical contact such that said electrical contact on said at least one arm is arranged for sliding engagement with said inner side of said at least one rib.

11. The push-switch according to claim 10, wherein a lower surface of said at least one rib abuts an upper surface of said at least one electrical contact.

12. The push-switch according to claim 1, wherein said recess is defined by an open upper end and a lower surface, and wherein said protrusion comprises a tongue such that a lower end of said tongue elastically engages said lower surface of said recess.

13. A method of manufacturing a push-switch, comprising:

in an electrically insulating tubular case having an open end and a closed end with at least one electrical contact projecting from said closed end towards said open end, accommodating an operation shaft for movement between said open end and said closed end;

attaching a contact piece to said operation shaft by positioning a fixing part of said contact piece into grooves provided at opposite ends of a holding part provided on a side of said operation shaft, and by positioning a protrusion of said contact piece directed toward said operation shaft into a recess of said holding part located between said grooves, such that upon movement of said operation shaft between said closed end and said open end an electrical contact on at least one arm of said contact piece slidably engages with a contact surface of said at least one electrical contact;

positioning a resilient member in said electrically insulating tubular case for urging said operation shaft from said closed end towards said open end; and closing said open end of said electrically insulating tubular case with a cover having an opening such that said operation shaft is received within said opening.

14. The method according to claim 13, wherein accommodating an operation shaft in an electrically insulating tubular case comprises accommodating said operation shaft in an insulating resin tubular case, and wherein said open end corresponds to a top of said insulating resin tubular case and said closed end corresponds to a bottom of said insulating resin tubular case, such that accommodating said operation shaft in said insulating resin tubular case comprises accommodating said operation shaft in said insulating resin tubular case for linear movement between said top and said bottom of said insulating resin tubular case.

15. The method according to claim 14, wherein said at least one electrical contact comprises two electrical contacts fixed to said bottom of said insulating resin tubular case and projecting therefrom towards said top of said insulating resin tubular case, such that accommodating said operation shaft in said insulating resin tubular case for linear movement between said top and said bottom of said insulating resin tubular case comprises accommodating said operation shaft in said insulating resin tubular case for linear movement between said top and said bottom with said two electrical contacts fixed to said bottom, and wherein said at least one arm having an electrical contact thereon comprises plural arms each having an electrical contact thereon and said contact piece comprises a thin elastic metal plate, such that attaching said contact piece to said operation shaft by positioning a fixing part of said contact piece into grooves provided at opposite ends of a holding part provided on a side of said operation shaft and by positioning a protrusion of said contact piece into a recess of said holding part located between said grooves allows for said plural arms to be deflected when said electrical contacts on said plural arms are in sliding contact with said two electrical contacts upon linear movement of said operation shaft between said top and said bottom of said insulating resin tubular case.

16. The method according to claim 15, wherein said resilient member comprises a slightly compressed coil spring, such that positioning a resilient member in said electrically insulating tubular case comprises positioning said slightly compressed coil spring in said insulating resin tubular case for urging said operation shaft away from said bottom of said insulating resin tubular case, and wherein said opening in said cover comprises a central opening of said cover, such that closing said open end of said electrically insulating tubular case with said cover comprises closing said top of said insulating resin tubular case with said cover whereby said operation shaft is received within said central opening.

17. The method according to claim 16, wherein said grooves comprise U-shaped grooves, said recess is centrally located between said U-shaped grooves, and said fixing part includes tongues extending from opposite ends thereof, respectively, such that attaching a contact piece to said operation shaft by positioning a fixing part of said contact piece into grooves and by positioning a protrusion of said contact piece into a recess of said holding part located between said grooves comprises attaching said contact piece to said operation shaft by passing said tongues into said U-shaped grooves from a bottom of said U-shaped grooves, respectively, and by positioning said protrusion in said centrally located recess.

18. The method according to claim 17, wherein said recess is defined by an open upper end and a lower surface, such that positioning said protrusion into said centrally located recess comprises positioning said protrusion into said centrally located recess such that said protrusion engages said lower surface.

19. The method according to claim 18, wherein two ribs project away from a lower side of said cover with an inner side of each of said two ribs being flush with said contact surface of each of said two electrical contacts, respectively, upon closing of said top with said cover, such that closing said top of said insulating resin tubular case with said cover allows for said plural arms to be deflected when said electrical contacts on said plural arms are in contact with said inner side of each of said two ribs, respectively.

20. The method according to claim 19, wherein closing said top of said insulating resin tubular case with said cover comprises:

inserting said operation shaft into said central opening of said cover, after attaching said contact piece to said operation shaft, such that said electrical contacts on said plural arms flexibly engage said inner side of each of said two ribs, respectively; and while maintaining the flexible engagement between said electrical contacts on said plural arms and said inner side of each of said two ribs, respectively, combining said cover with said insulating resin tubular case.

21. The method according to claim 13, wherein at least one rib projects away from a lower side of said cover with an inner side of said at least one rib being flush with said contact surface of said at least one electrical contact upon closing of said open end with said cover, such that closing said open end of said electrically insulating tubular case with said cover allows for said contact on said at least one arm to be in contact with said inner side of said at least one rib.

22. The method according to claim 21, wherein closing said open end of said electrically insulating tubular case with said cover comprises:

inserting said operation shaft into said opening of said cover, after attaching said contact piece to said operation shaft, such that said electrical contact on said at least one arm flexibly engages said inner side of said at least one rib; and while maintaining the flexible engagement between said electrical contact on said at least one arm and said inner side of said at least one rib, combining said cover with said electrically insulating tubular case.

23. A push-switch comprising:

an electrically insulating tubular case having an open end and a closed end;

at least one electrical contact projecting from said closed end of said electrically insulating tubular case towards said open end of said electrically insulating tubular case, said at least one electrical contact having a contact surface;

an operation shaft accommodated in said electrically insulating tubular case for movement between said open end and said closed end;

a contact piece attached to said operation shaft, said contact piece having at least one arm having an electrical contact thereon for sliding engagement with said contact surface of said at least one electrical contact upon movement of said operation shaft between said closed end and said open end;

a resilient member in said electrically insulating tubular case for urging said operation shaft from said closed end towards said open end;

a cover closing said open end of said electrically insulating tubular case, said cover having an opening receiving said operation shaft; and at least one rib projecting away from a lower side of said cover, with an inner side of said at least one rib being flush with said contact surface of said at least one electrical contact such that said electrical contact on said at least one arm is arranged for sliding engagement with said inner side of said at least one rib.

24. A method of manufacturing a push-switch, comprising:

in an electrically insulating tubular case having an open end and a closed end with at least one electrical contact projecting from said closed end towards said open end, accommodating an operation shaft for movement between said open end and said closed end;

attaching a contact piece to said operation shaft, said contact piece having at least one arm with an electrical contact thereon that is arranged to engage with a contact surface of said at least one electrical contact upon movement of said operation shaft between said open end and said closed end;

positioning a resilient member in said electrically insulating tubular case for urging said operation shaft from said closed end towards said open end; and closing said open end of said electrically insulating tubular case with a cover having an opening such that said operation shaft is received within said opening, wherein at least one rib projects away from a lower side of said cover with an inner side of said at least one rib being flush with said contact surface of said at least one electrical contact upon closing of said open end with said cover, whereby closing said open end of said electrically insulating tubular case with said cover comprises (i) inserting said operation shaft into said opening of said cover, after attaching said contact piece to said operation shaft, such that said electrical contact on said at least one arm flexibly engages said inner side of said at least one rib, and (ii) while maintaining the flexible engagement between said electrical contact on said at least one arm and said inner side of said at least one rib, combining said cover with said electrically insulating tubular case.

* * * * *